(12) United States Patent
Nakamura et al.

(10) Patent No.: US 11,402,727 B2
(45) Date of Patent: Aug. 2, 2022

(54) OPTICAL APPARATUS AND IMAGING SYSTEM INCLUDING THE SAME

(71) Applicant: CANON KABUSHIKI KAISHA, Tokyo (JP)

(72) Inventors: Tsubasa Nakamura, Saitama (JP); Kazuhiko Kajiyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 484 days.

(21) Appl. No.: 16/595,271

(22) Filed: Oct. 7, 2019

(65) Prior Publication Data

US 2020/0117073 A1 Apr. 16, 2020

(30) Foreign Application Priority Data

Oct. 16, 2018 (JP) .............................. JP2018-195422

(51) Int. Cl.
*G03B 17/14* (2021.01)
*G02B 13/22* (2006.01)

(52) U.S. Cl.
CPC ............. *G03B 17/14* (2013.01); *G02B 13/22* (2013.01)

(58) Field of Classification Search
CPC .... G03B 17/14; G03B 17/12; G03B 2215/00; G02B 13/22; G02B 27/0075
See application file for complete search history.

(56) References Cited

U.S. PATENT DOCUMENTS

| 5,926,283 A | 7/1999 | Hopkins | |
|---|---|---|---|
| 2009/0167921 A1 | 7/2009 | Mogi | |
| 2017/0214851 A1 | 7/2017 | Matsumoto | |
| 2018/0348607 A1 * | 12/2018 | Saito | H04N 5/2254 |
| 2022/0078331 A1 * | 3/2022 | Sugita | G03B 17/14 |

FOREIGN PATENT DOCUMENTS

| JP | 2010-102230 A | | 5/2010 | |
|---|---|---|---|---|
| JP | 6237161 B2 | | 11/2017 | |
| JP | 2020064165 A | * | 4/2020 | G02B 5/20 |

* cited by examiner

*Primary Examiner* — Christopher E Mahoney
(74) *Attorney, Agent, or Firm* — Canon U.S.A., Inc. IP Division

(57) ABSTRACT

An optical apparatus includes: an optical system; and a holding member configured to hold the optical system, wherein the holding member includes a first connection portion provided on an object side of the optical system, and a second connection portion provided between the optical system and the first connection portion, and wherein a lens apparatus is detachably mountable to the optical apparatus via the first connection portion, and an optical element is detachably mountable to the optical apparatus via the second connection portion.

20 Claims, 6 Drawing Sheets

OPTICAL APPARATUS AND IMAGING SYSTEM INCLUDING THE SAME

BACKGROUND OF THE INVENTION

Field of the Invention

The aspect of the embodiments relates to an optical apparatus, and is suitable for an imaging system such as, for example, a digital still camera or a video camera.

Description of the Related Art

As an optical apparatus (accessory apparatus) used in an imaging system, there is known an optical apparatus that forms a plurality of images of the same object (subject) using a plurality of lenses. In such an optical apparatus, by providing a plurality of filters having mutually-different transmission characteristics, on an optical axis of the plurality of lenses, it becomes possible to simultaneously acquire a plurality of pieces of mutually-different image information in one image capturing.

Japanese Patent No. 6237161 describes an optical apparatus including a diffusion element disposed on an image plane of an objective lens (lens apparatus). U.S. Pat. No. 5,926,283 describes an optical apparatus including a field lens disposed on an image plane of an objective lens. Japanese Patent No. 6237161 and U.S. Pat. No. 5,926,283 employ a diffusion element and a field lens for suppressing a decline in peripheral light quantity of light heading for a plurality of lenses from an objective lens, and an image defect.

Nevertheless, in the case of employing a diffusion element as in Japanese Patent No. 6237161, because it becomes impossible to acquire information regarding parallax in a plurality of images, it becomes difficult for an imaging system to acquire distance information. On the other hand, in the case of employing the field lens of U.S. Pat. No. 5,926,283, while it is possible to acquire information regarding parallax in a plurality of images, it becomes difficult to combine a plurality of pieces of image information when acquiring spectroscopic information.

SUMMARY OF THE INVENTION

The aspect of the embodiments is directed to providing an optical apparatus including: an optical system; and a holding member configured to hold the optical system, wherein the holding member includes a first connection portion provided on an object side of the optical system, and a second connection portion provided between the optical system and the first connection portion, and wherein a lens apparatus is detachably mountable to the optical apparatus via the first connection portion, and an optical element is detachably mountable to the optical apparatus via the second connection portion.

Further features of the disclosure will become apparent from the following description of exemplary embodiments (with reference to the attached drawings).

DESCRIPTION OF THE EMBODIMENTS

Figure 1A:
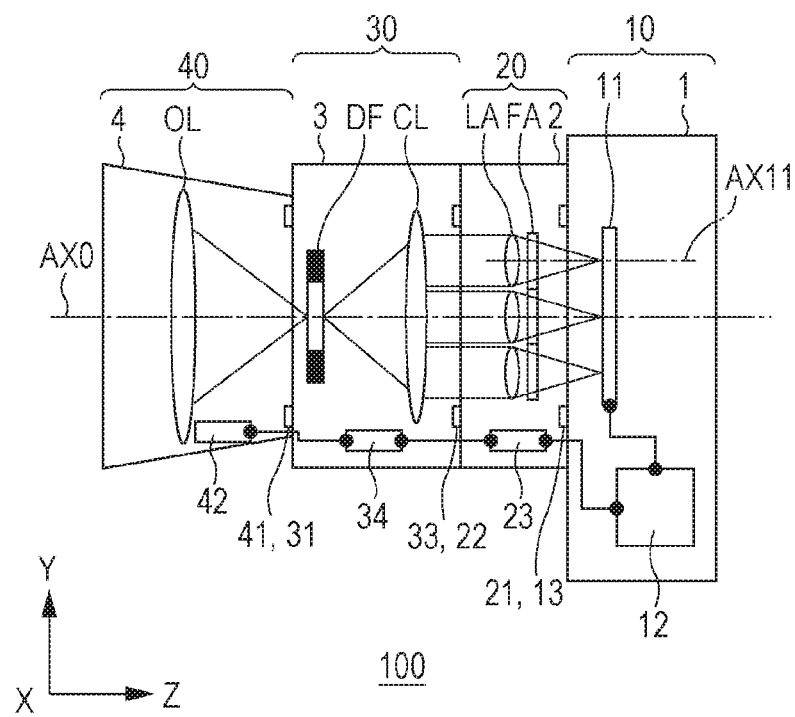
FIGS. 1A and 1B are main part schematic diagrams of an imaging system according to an exemplary embodiment.

Hereinafter, exemplary embodiments of the disclosure will be described with reference to the drawings. In addition, the drawings are sometimes drawn in a scale size different from an actual scale size for the sake of convenience. In addition, in the drawings, the same members are assigned the same reference numerals, and the redundant description will be omitted.

An imaging system 100 includes an imaging apparatus (camera unit) 10, an optical apparatus (array unit) 20, an adapter apparatus (adapter unit) 30, and a lens apparatus (lens unit) 40, which are disposed in order from an image side (+Z side).

The imaging apparatus 10 includes an image sensor (light-receiving element) 11 including an imaging plane (light-receiving surface) disposed on an image plane of the optical apparatus 20, and a holding member (casing) 1 that holds the image sensor 11. As the image sensor 11, a photoelectric conversion element such as a charge-coupled device (CCD) sensor or a complementary metal-oxide semiconductor (CMOS) sensor can be employed. In addition, the image sensor 11 may be configured to photoelectrically convert not only visible light but also infrared light (near-infrared light or far infrared light). For example, an image sensor that uses material such as Si, InGaAs, or InAsSb in accordance with a use wavelength range may be employed. In addition, the number of pixels of the image sensor 11 based on resolution required in the imaging system 100 is to be decided.

The optical apparatus 20 includes an optical system and the holding member (lens barrel) 2 that holds the optical system. The optical system according to the present exemplary embodiment includes a lens array LA including a plurality of lens units each forming an image of an object, and a filter array FA including a plurality of filters disposed on an optical axis of each lens unit. As illustrated in FIG. 1B, the plurality of filters in the filter array FA includes three or more filters arrayed in a first direction (X direction or Y direction) vertical to an optical axis (main optical axis) AX0 of the lens apparatus 40 and the adapter apparatus 30.

Each of the plurality of lens units according to the present exemplary embodiment consists of one or more lenses, and each of the lenses forms an image of an object on the imaging plane of the image sensor 11. In other words, a plurality of images (image array) of an object is formed on the image plane of the lens array LA by the plurality of lens units. That is, the lens array LA can copy an image of the same object. In addition, the plurality of lens units may be integrally formed for simplifying the manufacturing and arrangement, or may be separately formed for enabling individual position adjustment (focus adjustment, etc.).

The plurality of filters (optical filter) according to the present exemplary embodiment includes a plurality of filters having mutually-different transmission characteristics. The transmission characteristics refer to optical characteristics that change the state of incident light, including a wavelength band of light to be transmitted (transmission wavelength region), a direction and a type of polarized light to be transmitted (polarization state), the intensity of transmitted light with respect to the intensity of incident light (transmittance), and the like. That is, the filter array FA may include a plurality of polarizing filters having mutually-different types, a plurality of filters having mutually-different transmittances, and the like. By forming the filter array FA by a plurality of filters having mutually-different transmission characteristics, it becomes possible to simultaneously acquire a plurality of pieces of mutually-different image information for the same object.

Specifically, by using a plurality of filters (bandpass filters) having mutually-different center wavelengths of the transmission wavelength regions, it is possible to simultaneously acquire a plurality of pieces of image information corresponding to a plurality of wavelength bands. At this time, the imaging system 100 is formed as a multispectral camera that can acquire pieces of image information corresponding to wavelength bands of four types or more that are larger than wavelength bands (RGB) of a general camera. Furthermore, in one embodiment, the imaging system 100 is formed as a hyperspectral camera that can acquire pieces of image information corresponding to wavelength bands of 100 types or more. In addition, in place of a bandpass filter, a wavelength conversion filter that converts the wavelength of incident light and emits the resultant light.

Alternatively, by using a plurality of polarizing filters having mutually-different types, it is possible to simultaneously acquire a plurality of pieces of image information corresponding to a plurality of polarization states. For example, in some cases, it is considered to use three linear polarizing filters that let through linear polarized light in a direction parallel to each of the X direction (horizontal direction), the Y direction (vertical direction), and a direction with 45° relative to the X direction and the Y direction, and a circularly polarizing filter that lets through circularly polarized light. In this manner, by using a plurality of types of polarizing filters that change the polarization state of incident light, it is possible to acquire polarization information such as polarization characteristics (Stokes parameters) of an object, or a two-dimensional distribution of a polarization state of an object.

In addition, by forming the filter array FA by a plurality of filters having different types of transmission characteristics, it becomes possible to simultaneously acquire different types of information such as wavelength information, polarization information, brightness information, or parallax information. At this time, a configuration is not limited to a configuration in which a plurality of filters having mutually-different types is disposed on optical axes of mutually-different lens units, and a configuration in which the plurality of filters is disposed on the same optical axis may be employed. In the latter case, it is possible to separate acquired image information into different types of image information by performing filtering using an image processor (not illustrated).

In addition, the image sensor 11 consisting of silicon material generally used in a visible wavelength band has such sensitivity characteristics that sensitivity to a center wavelength band (near 550 nm) is higher than a short wavelength band (450 nm or less) and a long wavelength band (750 nm or more). Thus, in the case of using a plurality of bandpass filters respectively corresponding to these wavelength bands, in one embodiment, a neutral density filter in disposed on an optical axis on which a bandpass filter corresponding to a center wavelength band is disposed. At this time, by using a polarizing filter as a neutral density filter, it becomes possible not only to correct the balance of brightness of each piece of image information, but also to simultaneously acquire wavelength information and polarization information.

In addition, the filter array FA is to include at least two filters having mutually-different center wavelengths of transmission wavelength regions. In other words, the filter array FA may include a plurality of filters having the same transmission characteristics. For example, in the case of using the imaging system 100 as a distance-measuring apparatus (stereo camera), because distance information of an object is acquired using two piece of image information having mutually-different parallaxes, transmission characteristics of two filters corresponding to the respective pieces of image information are substantially equal. Nevertheless, for acquiring a larger number of a plurality of pieces of mutually-different image information in one image capturing, the transmission characteristics of all the plurality of filters are made different from one another.

As illustrated in FIG. 1B, the filter array FA according to the present exemplary embodiment includes nine filters F11 to F33 arrayed in the X direction and the Y direction. In addition, the lens array LA includes nine lens units corresponding to the nine filters. That is, if lens units and filters disposed on the same optical axis are collectively regarded as one imaging unit, the optical apparatus 20 includes nine imaging units. A plurality of imaging units is also collectively referred to as an imaging unit array.

In addition, the number of imaging units is not limited to this, and the optical apparatus 20 is to include at least three imaging units arrayed in the first direction. Nevertheless, for acquiring piece of image information corresponding to a larger number of transmission characteristics, in one image capturing, in one embodiment, four or more imaging units are provided, and in another embodiment, nine or more imaging units are provided as in the present exemplary embodiment. Light from an object sequentially passes through the lens array LA and the filter array FA and reaches the imaging plane of the image sensor 11. At this time, nine images (copied images) corresponding to the respective imaging units are formed on the imaging plane.

In addition, for downsizing the imaging apparatus 10, a common (single) image sensor is provided for each lens unit as in the image sensor 11 according to the present exemplary embodiment. In addition, by using a common image sensor for each lens unit, it is possible to acquire good image information even if the number or the arrangement of lens units is changed by the replacement of the optical apparatus 20. At this time, for enhancing the use efficiency of the image sensor 11, a plurality of pixels (photodiodes) constituting the image sensor 11 is disposed, uniformly and tightly as far as possible.

Nevertheless, as necessary, an image sensor may be individually provided for each lens unit. In this case, for downsizing the entire apparatus, image sensors are disposed uniformly and tightly as far as possible. In addition, for downsizing the optical apparatus 20, each lens unit is disposed in accordance with the shape of the imaging plane of the image sensor 11. Specifically, lens units are disposed in a square shape in an XY cross-section. In addition, if the imaging plane of the image sensor 11 does not have a square shape, an aspect ratio of the arrangement of lens units, or the like may be changed.

Figure 1B:
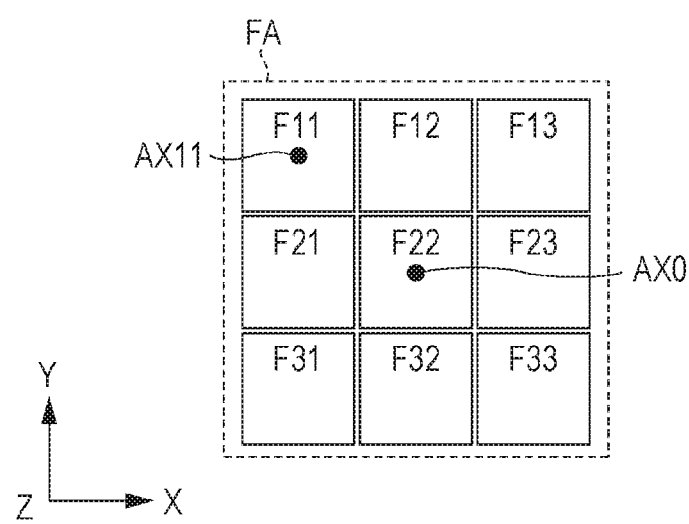

The order of arrangement in the optical axis direction of the lens array LA and the filter array FA is not limited to the order illustrated in FIG. 1A. For example, in the case of using interference bandpass filters, considering angular characteristics (angular dependence) thereof, the filter array FA is disposed closer to an object side than the lens array LA so as to reduce an incident angle of light with respect to each filter. Nevertheless, if each lens unit has sufficient telecentric property in the lens array LA, even though the filter array FA is disposed closer to the image side (+Z side) than the lens array LA, it is possible to reduce an incident angle of light with respect to each filter.

In addition, if the filter array FA is disposed closer to the object side than the lens array LA, there is a possibility that a defect of an off axial ray entering the lens array LA (vignetting) is caused. Thus, for example, in the case of using a filter having small angular dependence such as an absorption bandpass filter, or in the case of prioritizing light use efficiency more than angular dependence of a filter, filter array FA is disposed closer to the image side than the lens array LA.

In the present exemplary embodiment, by integrally holding the lens array LA and the filter array FA using the holding member 2, a shift in relative positions is suppressed. In addition, the holding member 2 includes a first mount portion 21 for connecting with the imaging apparatus 10. This can make the optical apparatus 20 mountable to the imaging apparatus 10 via the first mount portion 21 as an accessory apparatus. That is, it becomes possible to simultaneously replace the lens array LA and the filter array FA while integrally holding the lens array LA and the filter array FA with respect to the imaging apparatus 10.

With this configuration, it is possible to change the type or resolution of image information to be acquired, while suppressing a shift in relative positions of the lens array LA and the filter array FA. Specifically, when replacing the filter array FA with a filter array having different transmission characteristics, it is possible to simultaneously replace the lens array LA with a lens array corresponding to each filter array (optimized lens array). This can suppress a change in aberration or focus of each lens. In addition, by replacing the lens array LA with a lens array including a different number of lens units, it is possible to change resolution of the imaging system 100. Also in this case, it is possible to simultaneously replace the filter array FA with a filter array corresponding to each lens array.

In this manner, according to the imaging system 100 according to the present exemplary embodiment, it is possible to replace the optical apparatus 20 in accordance with image information desired to be acquired. In particular, because the lens array LA is replaceable, by increasing or decreasing the number of lens units, it is possible to increase or decrease the type (the number of bands, etc.) or resolution of image information. In addition, because the lens array LA and the filter array FA are integrally replaceable, it is possible to suppress a change in optical performance in replacement. With this configuration, it becomes possible to simultaneously acquire a plurality of pieces of good image information by a common imaging apparatus 10 irrespective of the configuration of the optical apparatus 20.

The shape of the first mount portion 21 can be a shape corresponding to a mount portion 13 provided in the imaging apparatus 10. For example, it is possible to employ, as the first mount portion 21, a connection portion (protruded portion, recessed portion, magnet, etc.) provided on the circumference surrounding the imaging plane when viewed in the optical axis direction (Z direction). In FIG. 1A, the first mount portion 21 is illustrated as a recessed portion and the mount portion 13 of the imaging apparatus 10 is illustrated as a protruded portion, but the shape of each mount portion is not limited to this. In addition, in one embodiment, the first mount portion 21 is provided with an electrical contact (terminal) for electrically connecting with the imaging apparatus 10. With this configuration, it becomes possible for the optical apparatus 20 to communicate with the imaging apparatus 10 or receive power from the imaging apparatus 10, via the electrical contact.

In addition, as illustrated in FIG. 1A, the holding member 2 may include not only the first mount portion 21 provided on the image side, but also a second mount portion 22 provided on the object side. With this configuration, it is possible to make an accessory apparatus such as the lens apparatus 40 or the adapter apparatus 30 mountable to the optical apparatus 20. In FIG. 1A, the second mount portion 22 is illustrated as a protruded portion, but the shape of the second mount portion 22 is not limited to this, and the shape is to be set in accordance with the shape of a mount portion in an accessory apparatus to be attached. In addition, in one embodiment, the second mount portion 22 is also provided with an electrical contact for performing communication and power reception and supply to an accessory apparatus.

In addition, when the optical apparatus 20 is attached to the imaging apparatus 10, depending on the manufacturing accuracy of each mount portion, there is a possibility that a mounting error is caused, and an error in positional relationship between the lens array LA and the filter array FA, and the image sensor 11 is caused. When such an error is caused, out of focus (defocus) of the lens array LA with respect to the imaging plane of the image sensor 11 is caused. Thus, a moving mechanism for moving the lens array LA in the optical axis direction is provided, and the focus of the lens array LA is made adjustable.

Alternatively, a moving mechanism for moving the image sensor 11 in the optical axis direction in place of the lens array LA may be provided, and focus adjustment (sensor focus) may be enabled by the movement of the image sensor 11. In addition, there is a possibility that the image plane of the lens array LA is inclined with respect to the imaging plane due to a mounting error of the optical apparatus 20, and field curvature or out of focus different for each lens unit is caused. Thus, inclination (tilt angle) of the image sensor 11 with respect to the optical axis is made changeable. Furthermore, image shake correction (image stabilizing) may be enabled by moving the image sensor 11 in a direction including components in a direction vertical to the optical axis.

In one embodiment, all the lens units in the lens array LA include lens surfaces including the same shape. With this configuration, manufacturing of each lens unit becomes easier, and it is possible to save the cost of the lens array LA. At this time, the shapes of the lens units are the same, but the shapes of the lens units may be made mutually different as necessary. In addition, by forming each lens unit by a plurality of lenses disposed on an optical axis, chromatic aberration may be made correctable more satisfactorily. In addition, if a difference in transmission wavelength region of each filter (use wavelength range of the imaging system 100) is large, and it is difficult to correct chromatic aberration, by individually moving lenses, each image forming position (on-axis chromatic aberration) may be adjusted.

The lens apparatus 40 according to the present exemplary embodiment includes an optical system OL including one or more lenses shared by imaging units of the optical apparatus 20, and a holding member (lens barrel) 4 that holds the optical system OL. The lens apparatus 40 has a function of converting a field angle (imaging field angle) of the imaging system 100. That is, by replacing the lens apparatus 40 with a lens apparatus having a different configuration of the optical system OL, it is possible to acquire pieces of image information corresponding to various field angles. In addition, by forming each lens unit in the lens array LA by a plurality of lens units without using the lens apparatus 40, and making an interval between adjacent lens units changeable, it is also possible to change a field angle of the imaging system 100. Nevertheless, in this case, difficulty levels of manufacturing and control of the lens array LA become higher, and the configuration of the optical apparatus 20 gets complicated and upsized.

Thus, for simplifying and downsizing the optical apparatus 20, a field angle of the imaging system 100 can be changed by the replacement of the lens apparatus 40 as in the present exemplary embodiment. In addition, by making movable at least one lens constituting the optical system OL in the lens apparatus 40, focus adjustment (focusing) may be performed. In addition, by forming the optical system OL by a plurality of lens units and changing an interval between adjacent lens units, and changing a focal length of the imaging system 100, a field angle or an imaging magnification may be made adjustable.

The adapter apparatus 30 according to the present exemplary embodiment includes a diffusion element DF that diffuses light, an optical system (optical unit) CL including one or more lenses, and a holding member 3 that holds the diffusion element DF and the optical system CL. The diffusion element DF is disposed at the position of an intermediate image plane (primary image-forming plane) formed by the lens apparatus 40, and serves as a screen. As the diffusion element DF, a diffusing member (diffusing plate) having a diffusion surface (rough surface), a microlens array consisting of a plurality of micro lenses, or the like can be employed. The optical system CL has a function as a collimator optical system that converts light from the diffusion element DF into parallel light and guides the parallel light to the optical apparatus 20. Nevertheless, the parallel light is not limited to strict parallel light, and includes substantially-parallel light (weak diverging light or weal converging light).

As described above, angular dependence exists in a transmission wavelength of an interference bandpass filter, and a fluctuation in a center wavelength of a transmission wavelength region generally becomes larger as getting closer to a long wavelength side. In addition, when a bandpass filter is disposed at a position distant from the main optical axis AX0, an angle of light entering the bandpass filter is likely to be large. Thus, there is a possibility that a fluctuation angle of a center wavelength of a transmission wavelength region becomes large. Thus, by making light entering the filter array FA, parallel light using the adapter apparatus 30, an incident angle of light with respect to each filter becomes substantially equal irrespective of position. It is therefore possible to suppress a change in angular dependence that is caused by the arrangement of each filter.

The holding member 4 in the lens apparatus 40 and the holding member 3 in the adapter apparatus 30 respectively include a mount portion 41 and a mount portion 31 for connecting with each other. With this configuration, it is possible to make the lens apparatus 40 mountable to the optical apparatus 20 via the adapter apparatus 30. In addition, the holding member 3 in the adapter apparatus 30 includes a mount portion 33 for connecting with the second mount portion 22 of the optical apparatus 20. With this configuration, it is possible to make the adapter apparatus 30 mountable to the optical apparatus 20 via each mount portion. At this time, even when the lens apparatus 40 cannot be directly mounted to the imaging apparatus 10 and the optical apparatus 20, it becomes possible to indirectly mount the lens apparatus 40 via the adapter apparatus 30.

Nevertheless, the first mount portion 21 of the optical apparatus 20 and the mount portion 41 of the lens apparatus 40 have the same shape, and the mount portion 13 of the imaging apparatus 10 and the mount portion 31 of the adapter apparatus 30 have the same shape. In other words, the lens apparatus 40 mountable to the imaging apparatus 10 also has a configuration mountable to the adapter apparatus 30. With this configuration, it becomes possible to form an imaging system that can simultaneously acquire a plurality of pieces of image information in one image capturing using the imaging apparatus 10 serving as a general camera and the lens apparatus 40 serving as a general interchangeable lens.

In addition, by using the adapter apparatus 30, the imaging system 100 according to the present exemplary embodiment employs a configuration in which parallel light enters the optical apparatus 20. With this configuration, it becomes possible to apply the optical apparatus 20 according to the present exemplary embodiment also to a lens apparatus that does not form an intermediate image of an object. Thus, for ensuring compatibility of the optical apparatus 20, the lens apparatus 40, and the adapter apparatus 30, the shapes of mount portions of the respective apparatuses are the same shape irrespective of the configuration of each optical system.

In addition, in the case of using a lens apparatus that forms an intermediate image of an object as in the lens apparatus 40 of the present exemplary embodiment, a field stop is disposed at the position of the intermediate image plane. With this configuration, it is possible to appropriately set the shape of a boundary and the size of each image formed on the imaging plane of the image sensor 11. For example, when light from each imaging unit interferes with each other on the imaging plane, it is that a size of an aperture provided at a field stop (aperture diameter) is made small. At this time, for enhancing use efficiency of the image sensor 11, the shape of the aperture at the field stop is a shape that can equally divide the imaging plane, such as a rectangular shape.

In addition, because the boundary of each image on the imaging plane becomes clearer as the field stop is brought closer to the position of the intermediate image plane, when the diffusion element DF is disposed at the position of the intermediate image plane as in the present exemplary embodiment, in one embodiment, the field stop is disposed so as to be closely attached to the diffusion element DF. At this time, when the diffusion element DF has a thickness, for reducing the influence of scattering within the diffusion element DF, in another embodiment, the field stop is disposed on the image side of the diffusion element DF. In the present exemplary embodiment, by providing a light shielding member (light shielding member paint) at a portion other than the central portion (rectangular portion) of the diffusion element DF, the diffusion element DF can have a function as a field stop. Alternatively, by disposing the diffusion element DF at an aperture portion provided on a light shielding member forming a field stop, the field stop and the diffusion element DF may be integrally formed.

When the diffusion element DF is disposed at the position of the intermediate image plane, light from the lens apparatus 40 is diffused by the diffusion element DF. Thus, information regarding an incident angle of light from the lens apparatus 40 is lost, and it is possible to suppress the generation of parallax in each image. Nevertheless, when the imaging system 100 according to the present exemplary embodiment is used as a distance-measuring apparatus, for acquiring information regarding a distance to an object, using parallax of each image, information regarding an incident angle of light from the lens apparatus 40 is provided. In this case, by disposing a positive lens serving as a field lens, immediately before the field stop in place of the diffusion element DF, it is possible to implement a function similar to the present exemplary embodiment, while leaving information regarding an incident angle.

Next, a processing system in the imaging system 100 will be described. As described above, characteristics of image information output from the image sensor 11 change depending on the configuration of the optical apparatus 20 attached to the imaging apparatus 10. Thus, even if any optical apparatus 20 is attached to the imaging apparatus 10, a system for appropriately processing image information is implemented. Specifically, in one embodiment, the optical apparatus 20 includes a communication unit for transmitting and receiving information to and from the imaging apparatus 10, and a recognition unit for recognizing connection with the imaging apparatus 10.

FIG. 1A illustrates a case where the imaging apparatus 10 includes a processor 12 and the optical apparatus 20 includes a processor 23. The processor 12 at least has functions as a communication unit and a recognition unit. The processor 23 at least has a function as a communication unit (storage unit). When the optical apparatus 20 is attached to the imaging apparatus 10, the processor 12 and the processor 23 are electrically connected with each other, and can transmit and receive information (signal). The processor 12 and the processor 23 can transmit and receive information via an electrical contact provided at the respective mount portions of the imaging apparatus 10 and the optical apparatus 20. Nevertheless, when an electrical contact is not provided at each mount portion, for example, wireless communication such as optical communication may be performed.

The processor 23 stores unique information regarding the optical apparatus 20, and the processor 12 recognizes that the optical apparatus 20 has been attached to the imaging apparatus 10, by receiving the unique information. The unique information of the optical apparatus 20 is, for example, an identifier (ID) such as an identification number regarding each of the lens array LA and the filter array FA, or an identifier regarding the combination of the lens array LA and the filter array FA. The processor 23 can recognize the type and identify the optical apparatus 20 based on the received unique information.

In the imaging system 100 according to the present exemplary embodiment, because the imaging apparatus 10 includes a power source and the optical apparatus 20 does not include a power source, and the optical apparatus 20 has been attached, by the processor 12 in the imaging apparatus 10. In this case, the processor 23 only has a function as a storage unit (communication unit) that stores unique information. Nevertheless, when the processor 12 and the processor 23 perform wireless communication, the imaging apparatus 10 and the optical apparatus 20 may be each provided with a power source, and may be configured to individually perform recognition.

The processor 12 also has a function as an image processor (processor), and processes image information output from the image sensor 11, in accordance with the received unique information. At this time, information regarding the lens array LA in the optical apparatus 20 (the number of lens units, arrangement, etc.) or information regarding the filter array FA (transmission characteristics of filter, arrangement, etc.) and unique information are associated with each other in advance, and recorded into the processor 12 or an external device as a data table. With this configuration, the processor 12 can recognize the configuration (characteristics) of the attached optical apparatus 20, by checking the received unique information against the data table.

In addition, as necessary, information itself such as the lens array LA or the filter array FA as described above may be recorded into the processor 23 as unique information, and the processor 12 may be configured to acquire the information from the processor 23. Nevertheless, for simplifying and downsizing the optical apparatus 20, information recorded in the processor 23 is minimum information such as identification number for discriminating the type of the optical apparatus 20 or identifying the optical apparatus 20 as described above.

For example, if the filter array FA consists of bandpass filters, the processor 12 appropriately divide or rearrange one piece of image information output from the image sensor 11, based on information regarding the lens array LA and the filter array FA. With this configuration, it is possible to generate a plurality of pieces of image information (multispectral images) for each wavelength band corresponding to a bandpass filter. At this time, as necessary, by overlaying (recombining) a plurality of pieces of image information, one multispectral image may be generated.

In addition, by transmitting image information output from the image sensor 11, to an external device, the above-described image processing may be performed not by the processor 12 but by the external device. In this case, for clarifying correspondence relationship between information regarding the optical apparatus 20 and image information, information stored in the processor 23 is added to the image information, and then, the image information is transmitted to the external device. Alternatively, the processor 23 may be provided on the outside of the imaging apparatus 10 as an external device.

In addition, the lens apparatus 40 includes a processor 42 similar to the processor 23 in the optical apparatus 20. The processor 42 stores unique information regarding the lens apparatus 40, and can transmit the unique information to the processor 12 in the imaging apparatus 10 directly or via the processor 23 in the optical apparatus 20. The processor 12 can recognize the type and identify the lens apparatus 40 based on the unique information of the lens apparatus 40. In accordance with at least one of unique information of the lens apparatus 40 and unique information of the optical apparatus 20, the processor 12 can process image information output from the image sensor 11.

In addition, the adapter apparatus 30 includes a processor 34 similar to the processor 23 in the optical apparatus 20. The processor 34 stores unique information regarding the adapter apparatus 30, and can transmit the unique information to the processor 12 in the imaging apparatus 10 directly or via the processor 23 in the optical apparatus 20. The processor 12 can recognize the type and identify the lens apparatus 40 based on the unique information of the adapter apparatus 30. In addition, in accordance with at least one of pieces of unique information of the lens apparatus 40, the adapter apparatus 30, and the optical apparatus 20, the processor 12 can process image information output from the image sensor 11. At this time, using the unique information of the lens apparatus 40, the influence on image information that is caused by aberration generated in the lens apparatus 40 may be corrected.

First Exemplary Embodiment

Figure 2:
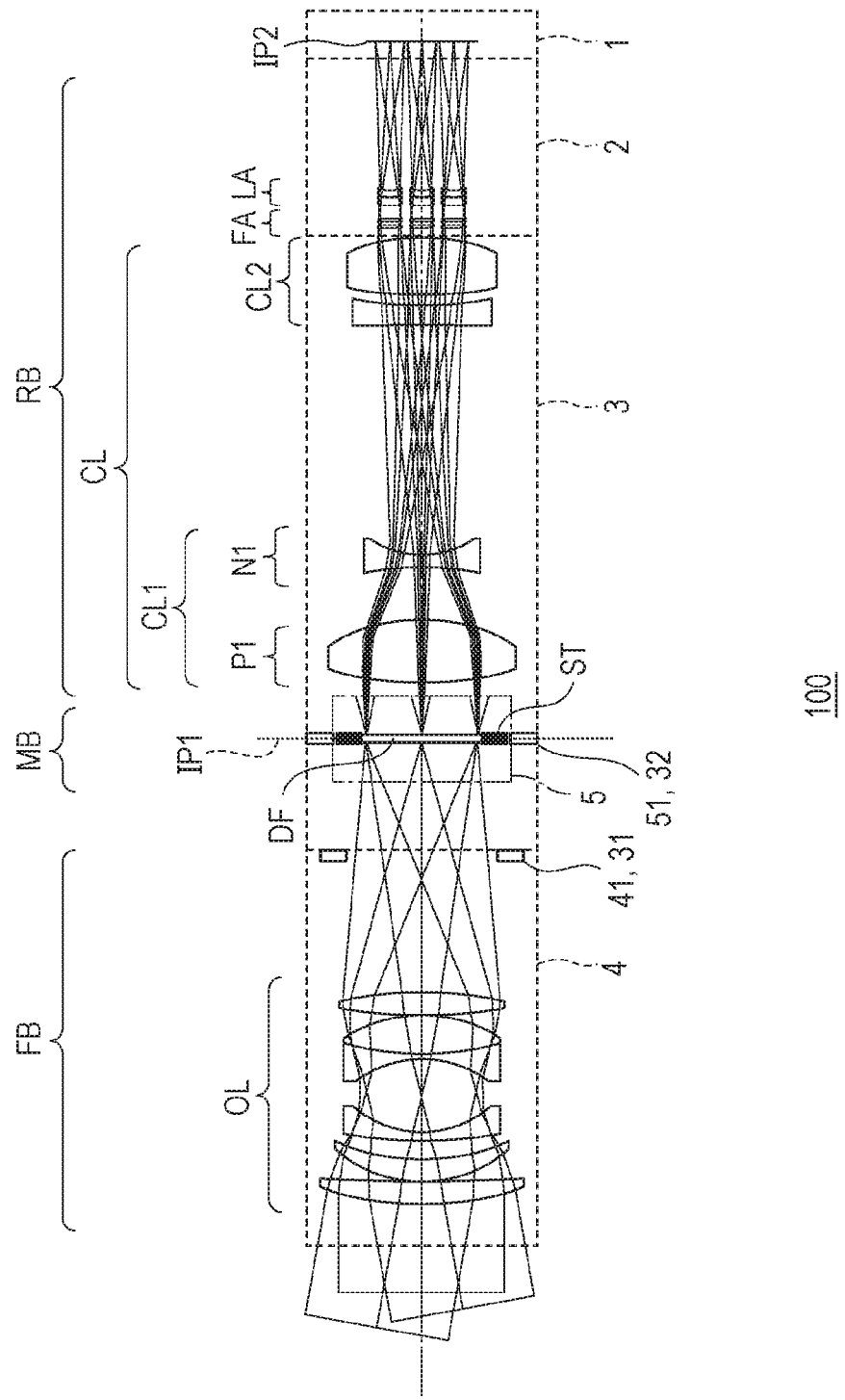
FIG. 2 is a main part schematic diagram of an imaging system according to a first exemplary embodiment.

Hereinafter, an imaging system according to the first exemplary embodiment of the disclosure will be described. FIG. 2 is a main part schematic diagram of the imaging system 100 according to the present exemplary embodiment.

The optical system in the imaging system 100 consists of a plurality of relay optical systems, and includes a front optical system (lens apparatus) FB, a middle optical system (optical element) MB, and a rear optical system (optical apparatus) RB, which are disposed in order from the object side.

The rear optical system RB includes the optical system (collimator optical system) CL, and the holding member 3 holding the optical system CL. In addition, the rear optical system RB includes the lens array LA including a plurality of lens units, the filter array FA including a plurality of filters disposed on optical axes of the plurality of lens units, and the holding member 2 holding the lens array LA and the filter array FA.

The optical system CL has a function of making light fluxes emitted from the primary image-forming plane, into collimated light (parallel light) before entering the lens array LA. By making light fluxes entering the lens array LA, into collimated light, it is possible to suppress the generation of decentration aberration for a lens unit separated from the optical axis (main optical axis) of the objective optical system OL in the lens array LA. With this configuration, it is possible to form the lens units in the lens array LA into the same shape (common design), and it becomes possible to reduce cost of the entire system. In addition, because it is possible to make light fluxes entering each lens unit, symmetric with respect to the optical axis of each lens unit, it is possible to reduce unevenness in a plurality of images that is caused by a field angle, and further simplify aberration correction.

In addition, in the case of forming the lens array LA and the filter array FA as accessory apparatuses separately from the optical system CL, it is that a connection portion for making the arrays mountable to each other is provided on the holding members 2 and 3. When the arrays are not to be made mountable to each other, the holding members 2 and 3 may be integrally formed. The holding member 2 and a holding member (imaging apparatus) 1 holding an image sensor may be made mountable. In this case, a connection portion (third connection portion) corresponding to the holding members 1 and 2 is provided. The front optical system FB includes the objective optical system OL consisting of a plurality of lenses, and the holding member 4 holding the objective optical system OL. The middle optical system MB includes the diffusion element (optical element) DF, and a holding member 5 holding the diffusion element DF.

In addition, the holding member 3 includes a first connection portion (a mount portion) 31 for connecting with the holding member 4 of the front optical system FB, and a second connection portion 32 for connecting with the middle optical system MB. The first connection portion 31 is provided on the object side of the optical system CL. The second connection portion 32 is provided between the optical system CL and the first connection portion 31 (between the optical system CL and the front optical system PB). The holding member 4 of the front optical system FB is provided with a connection portion (a mount portion) 41 corresponding to the first connection portion 31, and the holding member 5 of the middle optical system MB is provided with a connection portion 51 corresponding to the second connection portion 32.

With this configuration, to the rear optical system RB, the front optical system PB is mountable via the first connection portion 31, and the middle optical system MB is mountable via the second connection portion 32. With this configuration, also in the case of using a common rear optical system RB, by replacing the front optical system PB or the middle optical system MB in accordance with image information desired to be acquired, it becomes possible to acquire various piece of good image information. In addition, when the front optical system PB is not replaced, it is possible to switch optical performance of the entire system only by replacing one component of the middle optical system MB.

In addition, as described in the above-described exemplary embodiment, the connection portion (first connection portion 31) of the front optical system FB and the rear optical system RB are provided with an electrical contact. On the other hand, the connection portion (the second connection portion 32) of the front optical system FB and the middle optical system MB needs not be provided with an electrical contact, but may be provided with an electrical contact as necessary. The holding member 3 of the rear optical system RB is provided with a space (region) for inserting the middle optical system MB, but a method of inserting the middle optical system MB into the space is not especially limited. For example, the middle optical system MB may be inserted from an aperture on the object side in the optical axis direction, or an aperture may be provided on a surface vertical to the optical axis direction of the holding member 3, and the middle optical system MB may be inserted from the aperture.

In the present exemplary embodiment, when the front optical system FB and the middle optical system MB are attached to the rear optical system RB, the diffusion element DF is disposed on an image plane (primary image-forming plane) IP1 of the front optical system FB. In addition, an image on the image plane IP1 is formed on an image plane (imaging plane) IP2 being a final image-forming plane. In addition, a light absorption member is provided on the outer circumference of the diffusion element DF, and this serves as a field stop ST. That is, in the present exemplary embodiment, the diffusion element DF and the field stop ST are integrally formed. The field stop ST has a function of determining a field angle of an individual copy image created by the lens array LA in the rear optical system RB. If the diffusion element DF has characteristics of diffusing light fluxes entering from the front side, to the rear side symmetrically with respect to a plane normal, even if an objective lens is replaced with a different lens, a distribution of rearward outgoing light fluxes is expected to remain almost unchanged. For bringing a rearward outgoing light flux angle closer to symmetry with respect to the main optical axis, characteristics are adjusted within the surface of the diffusion element DF (diffusion directions are distributed, etc.), or the diffusion element DF has refractive power. In order to give power to the diffusion element DF, for example, a Fresnel lens is formed on at least one of the front and rear sides of the diffusion element DF.

In one embodiment, the optical system CL of the rear optical system RB is telecentric with respect to the object side. With this configuration, it becomes easier to fill the entire region of the lens array LA with light fluxes emitted from the diffusion element DF. Hereinafter, the detailed description will be given using FIGS. 3A and 3B.

Figure 3A:
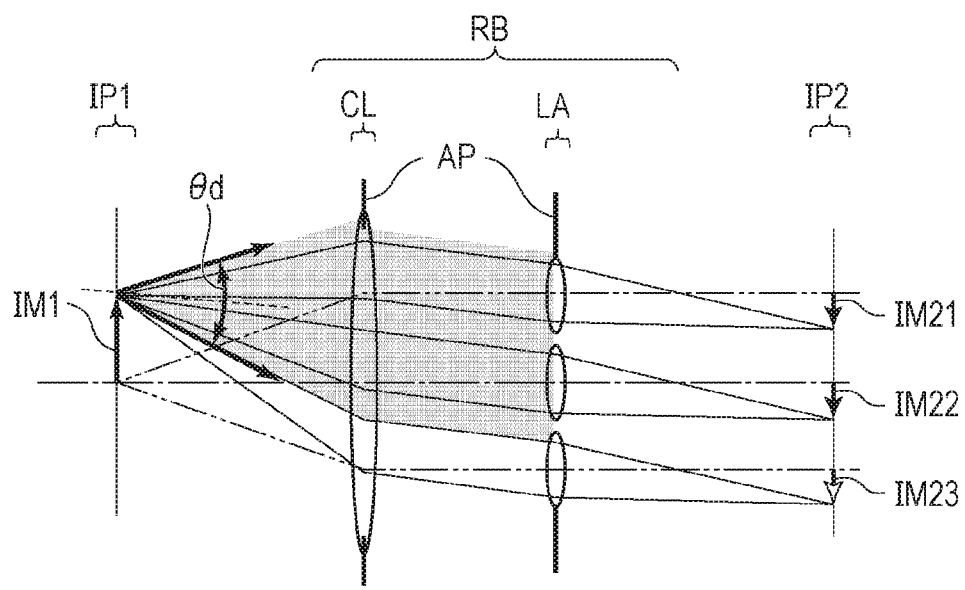
FIGS. 3A and 3B are main part schematic diagrams of an imaging system according to a second exemplary embodiment.
Figure 3B:
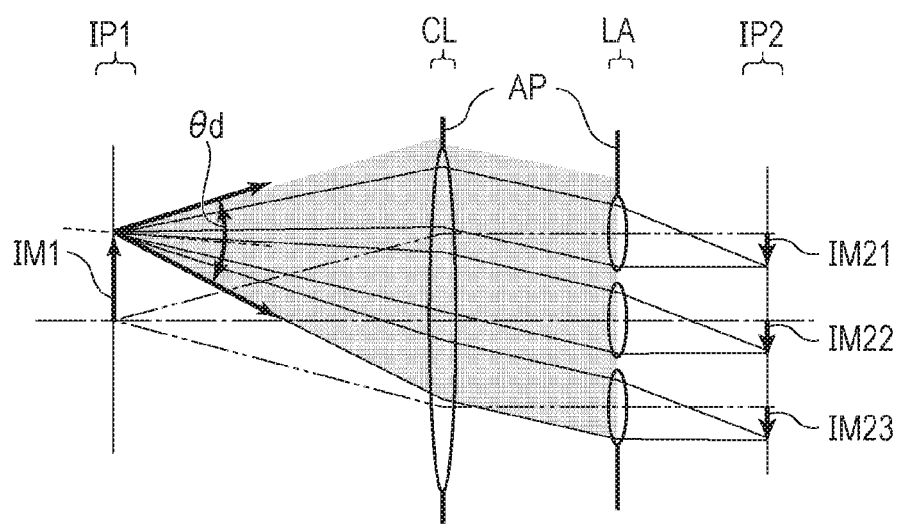

FIGS. 3A and 3B illustrate a relationship between light fluxes emitted from an intermediate image IM1 on the primary image-forming plane IP1, and the lens array LA in the rear optical system RB. A light flux is emitted from an off-axis point of the intermediate image IM1 at a diffusion angle θd, and enters the rear optical system RB. Here, for the sake of simplicity, the central axis of the diffusion angle θd of the diffusion element DF is assumed to be substantially parallel to the main optical axis. A light flux input to the rear optical system RB is converted by the optical system CL (represented by one lens for the sake of convenience) into parallel light, and enters the lens array LA. Lens units of the lens array LA form images IM21 to IM23 on the image plane IP2.

FIG. 3A illustrates a case where the optical system CL is not telecentric with respect to the object side (telecentric property is low). In FIG. 3A, all apertures of the lens array LA are not filled with light fluxes emitted from an off-axis point of the intermediate image IM1 at a diffusion angle θd, and in particular, the off-axis point of the image IM23 on the image plane IP2 does not form an image (defect). In this manner, when the optical system CL is not telecentric with respect to the object side, a decline in peripheral light quantity or an image defect is caused.

On the other hand, FIG. 3B illustrates a case where the optical system CL is telecentric with respect to the object side (telecentric property is high). In FIG. 3B, the entire surface of the lens array LA is filled with light fluxes emitted from an off-axis point of the intermediate image IM1 at a diffusion angle θd, and all the light fluxes for forming the images IM21 to IM23 can be guided to the image plane IP2.

In addition, if the number of light fluxes eclipsed by the optical system CL or an aperture wall AP of the lens array LA becomes larger, light use efficiency decreases and an image becomes darker. In this case, a SN ratio used when image information is processed (signal processing) decreases. Thus, in one embodiment, in-plane characteristics of the diffusion element DF are controlled, and a defect of an off-axis light flux that is caused by the aperture wall AP in the rear optical system RB becomes smaller as far as possible. In addition, the central axis of the diffusion angle θd of the diffusion element DF may be inclined in accordance with an off-axis light flux angle of the rear optical system RB. For example, in FIG. 3B, by inclining the central axis of the diffusion angle θd inward (toward the main optical axis side), it is possible to further suppress a defect of the off-axis light flux on the aperture wall AP. In addition, the central axis of the diffusion angle of the diffusion element DF is inclined more toward the main optical axis side as getting closer to an off-axis position.

Also in the case of FIG. 3A, if the diffusion angle θd is increased, it is possible to fill the entire surface of the lens array LA with light fluxes, but light fluxes shielded by the optical system CL and the aperture wall AP disposed on the outside of the lens array LA considerably increase. This becomes prominent as light fluxes emitted especially from an off-axis point in the intermediate image IM1 spread outward (in a direction getting away from the main optical axis). In addition, it is possible to fill the entire surface of the lens array LA with light fluxes by getting the optical system CL away from the primary image-forming plane IP1, but the total length of the entire system becomes longer.

In addition, depending on the configuration of the objective optical system OL, in some cases, an incident angle of the diffusion element DF is large, and the central axis of the rearward diffusion angle is shifted from a plane normal of the diffusion element DF. That is, the diffusion angle θd sometimes becomes nonparallel to the main optical axis. Thus, the diffusion angle θd of the diffusion element DF is set to a wider angle than a light flux angle filling an incident pupil of the entire lens array LA. Nevertheless, if the diffusion angle θd of the diffusion element is set to a too wide angle, an image on the image plane IP2 becomes dark. Accordingly, diffusion characteristics of the diffusion element DF considering an incident angle with respect to an image plane of an off-axis light flux of a general objective optical system is to be defined.

Specifically, the diffusion element DF in which a decreasing rate of the intensity of light emitted from the diffusion element DF, with respect to the intensity of light entering the diffusion element DF (intensity decreasing rate) is 50% or less within a range of ±10 [deg] with respect to the plane normal of the diffusion element DF is to be employed. Furthermore, the diffusion element DF is to be employed in which the intensity decreasing rate is 50% or less within a range of ±9 [deg] with respect to the plane normal, and it is moreover the diffusion element DF is to be employed in which the intensity decreasing rate is 50% or less within a range of ±8 [deg] with respect to the plane normal.

Second Exemplary Embodiment

Figure 4:
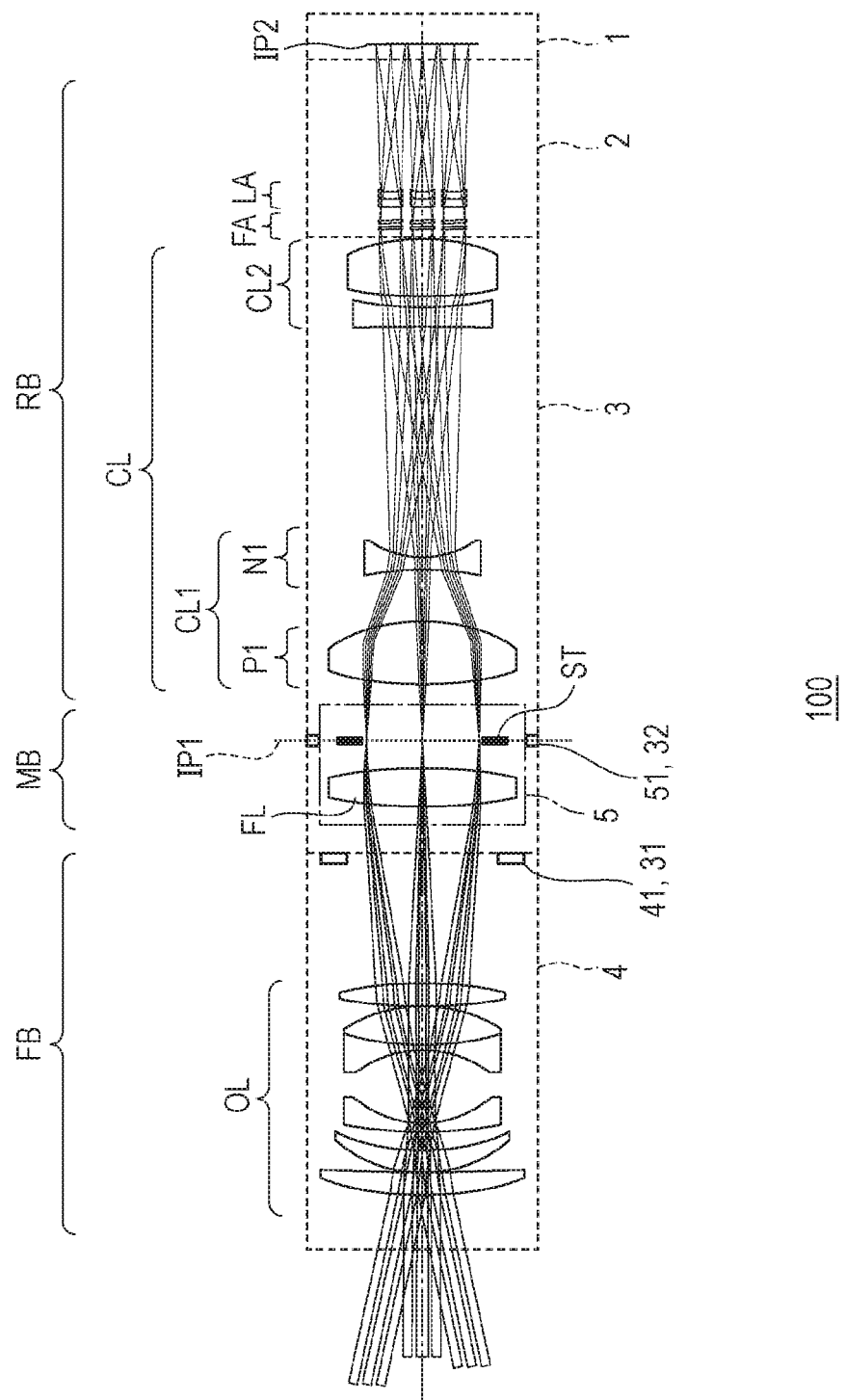
FIG. 4 is a diagram for describing a difference in optical path that is caused by a configuration of a rear optical system.

Hereinafter, an imaging system according to the second exemplary embodiment of the disclosure will be described. FIG. 4 is a main part schematic diagram of the imaging system 100 according to the present exemplary embodiment. The imaging system 100 according to the present exemplary embodiment employs a configuration similar to that of the imaging system 100 according to the first exemplary embodiment except for the configuration of the middle optical system MB.

The middle optical system MB according to the present exemplary embodiment includes a field lens FL in place of the diffusion element DF. In the present exemplary embodiment, when the front optical system PB and the middle optical system MB are attached to the rear optical system RB, the field stop ST is disposed at the position of the image plane IP1 of the front optical system FB, and the field lens FL is disposed on the object side of the image plane IP1 of the front optical system FB. The field lens FL has a function of converting an angle of an off-axis light flux entering the primary image-forming plane from the objective optical system OL, into substantially symmetric with respect to the main optical axis. This will be described in detail using FIGS. 5A and 5B.

Figure 5A:
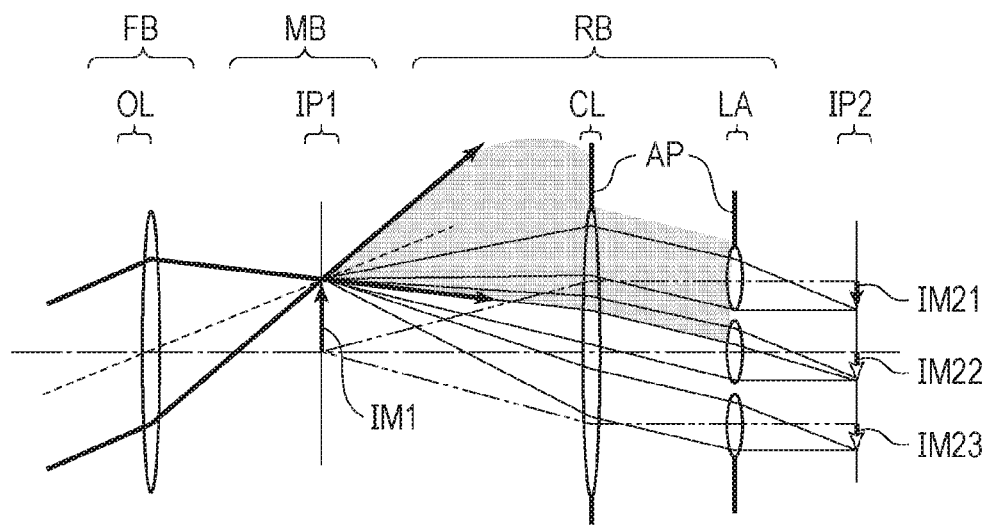
FIGS. 5A and 5B are diagrams for describing a difference in optical path that is caused by the presence or absence of a field lens.
Figure 5B:
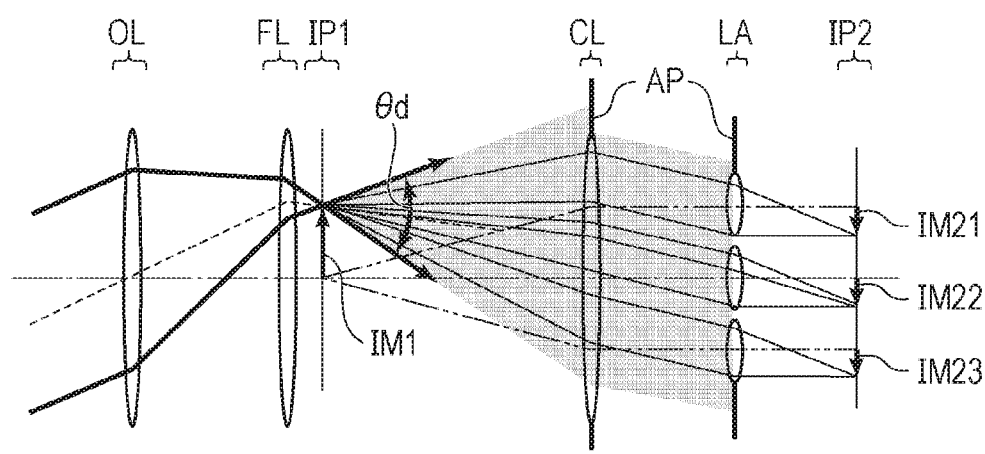

FIGS. 5A and 5B illustrate a relationship between light fluxes emitted from the objective optical system OL, and the lens array LA in the rear optical system RB. FIG. 5A illustrates a case where the field lens FL is not disposed, and FIG. 5B illustrates a case where the field lens FL is disposed. In addition, the configurations described in FIGS. 5A and 5B are common except for the presence or absence of the field lens FL.

In FIG. 5A, an off-axis light flux emitted from the objective optical system OL forms an off-axis point (off-axis field angle) of the intermediate image IM1 at the position of the primary image-forming plane IP1, but the light flux gets away from the main optical axis and all the apertures of the lens array LA are not filled. It can be thereby seen that a light quantity decline (defect of light flux) is generated in the image IM22, and the image IM23 is not formed.

On the other hand, in FIG. 5B, off-axis light fluxes emitted from the objective optical system OL are bent by the field lens FL so as to be substantially symmetric with respect to the main optical axis. At this time, by bringing an exit direction of the off-axis light flux (central axis of light flux) closer to the off-axis light flux angle of the rear optical system RB (the same central axis), it is possible to enhance light use efficiency.

In addition, in FIG. 5B, the central axis of off-axis light fluxes emitted from the field lens FL is inclined inward (toward the main optical axis side). With this configuration, it is possible to make light fluxes emitted from the primary image-forming plane IP1, substantially symmetric with respect to the main optical axis, and it is possible to cause the entire surface of the lens array LA to be filled with the light fluxes. Thus, connection with the rear optical system RB designed as a telecentric optical system is improved. That is, for sharing the rear optical system RB with a configuration in which the diffusion element DF is employed as in the first exemplary embodiment, the above-described configurations are employed anterior to and posterior to the primary image-forming plane IP1.

The configuration of the objective optical system OL of the front optical system PB is not limited as long as a primary image-forming plane can be formed, but because of being a relay optical system, an optical system with a relatively small incident angle of a light flux to a primary image-forming plane is used. If an incident angle of a light flux to a primary image-forming plane is large, the field lens FL in the middle optical system MB is to have large power, and aberration possibly increases.

In addition, an optical element other than the objective optical system OL may be disposed in the front optical system FB. For example, a polarizing filter or a neutral density filter that changes characteristics of incident light may be disposed. In particular, in the case of using the field lens FL, if an F value is to be changed using an aperture stop provided in the objective optical system OL, an image defect occurs around the incident light, and a defect sometimes occurs in a light flux entering a lens unit disposed at a position distant from the main optical axis in the lens array LA. Thus, by employing a configuration in which a neutral density filter is mountable to the front optical system FB, it becomes possible to perform good light quantity adjustment.

In addition, in one embodiment, from the viewpoint of removing stray light, a neutral density filter is disposed closer to the object side in the entire system as far as possible, and in another embodiment, a neutral density filter is disposed closer to the object side than the objective optical system OL. Alternatively, in the case of attaching importance to reducing a diameter of a neutral density filter, the neutral density filter may be disposed near (next to) the primary image-forming plane IP1.

The optical system CL according to the present exemplary embodiment consists of a front lens group CL1 and a rear lens group disposed at a widest interval in the optical system. At this time, the front lens group CL1 consists of a first lens unit P1 having positive refractive power and a second lens unit N1 having negative refractive power, which are disposed in order from the object side. With this configuration, because it is possible to set an object side principal point position of the optical system CL closer to the object side than the first lens unit P1, it becomes possible to downsize the entire system. In addition, in the present exemplary embodiment, each of the first lens unit P1 and the second lens unit N1 consists of one lens, but may include a plurality of lenses as necessary.

In addition, in one embodiment, the following conditional expression (1) is satisfied:

$$0.60 \leq |fP1/fN1| \leq 4.50 \tag{1}$$

where a focal length of the first lens unit P1 is fP1, and a focal length of the second lens unit N1 is fN1.

If a value of $|fP1/fN1|$ falls outside the range of conditional expression (1), a telecentric property of the optical system CL declines, and a decline in peripheral light quantity or an image defect possibly occurs. In addition, an absolute value of power of the first lens unit P1 or the second lens unit N1 becomes too big, and aberration correction becomes difficult, which is not preferable.

Furthermore, in one embodiment, the following conditional expressions (1a) to (1c) are sequentially satisfied.

$$0.80 \leq |fP1/fN1| \leq 3.50 \tag{1a}$$

$$1.00 \leq |fP1/fN1| \leq 2.50 \tag{1b}$$

$$1.10 \leq |fP1/fN1| \leq 2.10 \tag{1c}$$

In addition, when the front optical system FB and the middle optical system MB are attached to the rear optical system RB, in one embodiment, the following conditional expression (2) is satisfied:

$$0.52 \leq |fFL/LPL| \leq 1.98 \tag{2}$$

where a distance from an image side pupil of the front optical system PB to an object side principal point of the middle optical system MB is LPL, and a focal length of the middle optical system MB is fFL.

If a value of $|fFL/LPL|$ exceeds an upper limit of conditional expression (2), power of the field lens FL becomes too small, and the symmetry of an incident light flux angle toward a primary image-forming plane declines. In addition, a distance between the objective optical system OL and the field lens FL becomes too small, and the objective optical system OL and the field lens FL possibly interfere with each other. If a value of $|fFL/LPL|$ falls below a lower limit of conditional expression (2), power of the field lens FL becomes too large, and the symmetry of an incident light flux angle toward a primary image-forming plane declines. In addition, a curvature of an optical surface of the field lens FL becomes too large, and a thickness of the field lens FL increases, which is not preferable.

Furthermore, in another embodiment, the following conditional expressions (2a) to (2c) are sequentially satisfied.

$$0.54 \leq |fFL/LPL| \leq 1.86 \tag{2a}$$

$$0.56 \leq |fFL/LPL| \leq 1.75 \tag{2b}$$

$$0.58 \leq |fFL/LPL| \leq 1.64 \tag{2c}$$

In addition, when the front optical system FB and the middle optical system MB are attached to the rear optical system RB, and the following conditional expression (3) is satisfied:

$$0.75 \leq |fFL/LPI| \leq 1.65 \tag{3}$$

where a distance from an image side pupil of the front optical system PB to an image plane of the front optical system FB is LPI, and a focal length of the middle optical system MB is fFL.

If a value of $|fFL/LPI|$ exceeds an upper limit of conditional expression (3), power of the field lens FL becomes too small, and the symmetry of an incident light flux angle toward a primary image-forming plane declines. If a value of $|fFL/LPI|$ falls below a lower limit of conditional expression (3), power of the field lens FL becomes too large, and the symmetry of an incident light flux angle toward a primary image-forming plane declines. In addition, the field lens FL gets away from the primary image-forming plane too much, and aberration increases, which is not preferable.

Furthermore, yet in another embodiment, the following conditional expressions (3a) to (3c) are sequentially satisfied.

$$0.78 \leq |fFL/LPI| \leq 1.55 \tag{3a}$$

$$0.80 \leq |fFL/LPI| \leq 1.45 \tag{3b}$$

$$0.82 \leq |fFL/LPI| \leq 1.33 \tag{3c}$$

In addition, because a suitable configuration of the field lens FL varies depending on the configuration of the objective optical system OL, the field lens FL is to be replaced in accordance with the configuration of the objective optical system OL. In addition, an optical surface on the image side of the field lens FL is a convex shape (convex surface) toward the image side. With this configuration, it is possible to prevent reflected light (stray light) from the filter array FA, from being diffused and entering the imaging plane, and facilitate good aberration correction by decreasing a curvature of each optical surface of the field lens FL.

Hereinafter, Numerical Example 1 corresponding to the above-described second exemplary embodiment is shown. In Numerical Example 1, a surface number is an ordinal number of an optical surface from the object side to the image side. r [mm] denotes a curvature radius of an i-th optical surface, and d [mm] denotes an interval between the i-th optical surface and an (i+1)-th optical surface. In addition, Nd and vd respectively denote refractive index and Abbe number with respect to light with wavelength 587.6 nm (d-line) of medium (material) between the i-th optical surface and the (i+1)-th optical surface. In addition, because a numerical example corresponding to the first exemplary embodiment is similar to Numerical Example 1 except for the presence or absence of a field lens, the numerical example will be omitted.

(Numerical Example 1)
Unit: mm

Surface data

| Surface number | r | d | nd | vd |
|---|---|---|---|---|
| 1 | 49.7 | 3.5 | 1.74 | 44.8 |
| 2 | 239.1 | 0.2 | | |
| 3 | 20.6 | 3.5 | 1.74 | 44.8 |
| 4 | 33.2 | 2.9 | | |
| 5 | 66.7 | 1.5 | 1.67 | 32.1 |
| 6 | 16.2 | 7.1 | | |
| 7 | ∞ | 4.5 | | |
| 8 | −17.6 | 1.0 | 1.70 | 30.1 |
| 9 | 46.5 | 6.0 | 1.74 | 44.8 |
| 10 | −22.9 | 0.2 | | |
| 11 | 83.0 | 3.6 | 1.74 | 44.8 |
| 12 | −57.6 | 28.0 | | |
| 13 | 76.2 | 6.0 | 1.52 | 64.1 |
| 14 | −76.9 | 4.5 | | |
| 15 | ∞ | 9.0 | | |
| 16 | 56.6 | 10.0 | 1.58 | 40.9 |
| 17 | −28.9 | 8.3 | | |
| 18 | −49.2 | 2.0 | 1.62 | 60.3 |
| 19 | 14.0 | 36.6 | | |
| 20 | −584.6 | 3.0 | 1.76 | 27.5 |
| 21 | 48.2 | 1.9 | | |
| 22 | 66.0 | 9.0 | 1.62 | 60.3 |
| 23 | −28.2 | 1.5 | | |

-continued (Numerical Example 1)
Unit: mm

Surface data

| Surface number | r | d | nd | vd |
|---|---|---|---|---|
| 24 (stop) | ∞ | 0.5 | 1.56 | 58.7 |
| 25 | ∞ | 0.5 | | |
| 26 | ∞ | 0.5 | 1.56 | 58.7 |
| 27 | ∞ | 2.0 | | |
| 28 | 7.9 | 1.3 | 1.49 | 70.4 |
| 29 | 223.7 | 0.2 | | |
| 30 | 6.9 | 1.0 | 1.76 | 27.5 |
| 31 | 5.0 | 24.1 | | |
| Image plane | ∞ | | | |

Table 1 lists numerical values regarding each conditional expression in this example (Numerical Example 1). As listed in Table 1, all the conditional expressions are satisfied.

TABLE 1

| | Numerical Example 1 |
|---|---|
| fP1 | 34.8 |
| fN1 | −17.5 |
| fFL | 75.7 |
| LPL | 47.0 |
| LPI | 57.0 |
| Conditional Expression (1): |fP1/fN1| | 1.99 |
| Conditional Expression (2): |fFL/LPL| | 1.61 |
| Conditional Expression (3): |fFL/LPI| | 1.33 |

Modified Example

Hereinbefore, exemplary embodiments of the disclosure have been described, but the disclosure is not limited to these exemplary embodiments, and various combinations, modifications, and changes can be made without departing from the scope of the disclosure.

Figure 6:
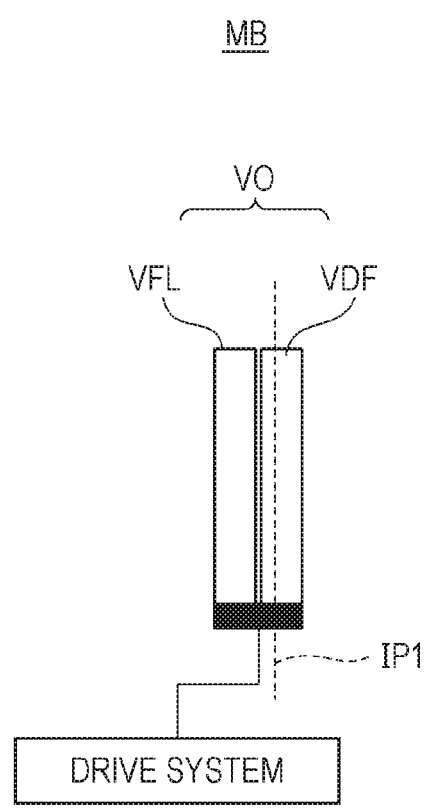
FIG. 6 is a main part schematic diagram of an optical element according to a modified example.

For example, as an optical element to be used in a middle optical system, an element that can switch functions of both of a field lens and a diffusion element may be employed. A variable optical element VO illustrated in FIG. 6 has a structure in which a variable refractive element VFL and the variable diffusion element VDF are bonded to each other, and characteristics of each element can be switched in accordance with power from the outside. As the variable refractive element VFL and the variable diffusion element VDF, for example, it is possible to employ an electro optical element including liquid crystal material.

When the variable optical element VO is desired to function as a field lens, power is added in such a manner that the variable refractive element VFL has refractive power and the variable diffusion element VDF does not have diffusion characteristics (enter simple transmission state). When the variable optical element VO is desired to function as a diffusion element, power is added in such a manner that the variable refractive element VFL does not have refractive power (enter simple transmission state), and the variable diffusion element VDF has diffusion characteristics.

Normally, it is that power is added in such a manner that a function of any one of the elements is validated, but both functions may be validated as necessary. For example, power may be simultaneously added to the variable diffusion element VDF and the variable refractive element VFL for adjusting a diffusion direction of an off-axis light flux. In addition, when the variable optical element VO is attached to a rear optical system, the variable diffusion element VDF is positioned on the primary image-forming plane IP1. If the variable diffusion element VDF is shifted from the primary image-forming plane IP1, blurring of an image caused by the objective optical system OL is transmitted to the image side, and a resolution on the final image-forming plane possibly declines.

In addition, in the first exemplary embodiment, a field lens is disposed on the object side of the primary image-forming plane, but a field lens may be disposed on the image side in accordance with the configuration of another optical system. In addition, a holding member holding a field lens may hold a field stop. That is, a field lens and a field stop may be made mountable to an optical apparatus as one unit. Alternatively, by holding a field stop using a holding member other than a holding member that holds a field lens, the field stop and the field lens may be made individually mountable. In addition, when a field stop is not made mountable, holding may be performed by a holding member of a rear optical system.

In the first exemplary embodiment, the description has been given of a case where a lens unit also serves as an aperture stop, that is to say, a case where an effective diameter of a lens unit is defined by the lens unit itself, but an aperture stop may be provided as a separate member. In addition, in one imaging unit, when a lens unit includes a plurality of lenses, or when a filter includes a plurality of filter elements, the lenses and the filter elements may be alternately disposed in the optical axis direction.

Furthermore, an imaging unit including a plurality of filters disposed so as to divide a pupil of a lens unit in the XY cross-section may be employed. At this time, by providing a minute lens array in a region corresponding to the imaging unit on the imaging plane, an imaging system can be used as a plenoptic camera. With this configuration, light passing through a pupil of one lens unit is separated, and enters mutually-different pixels on the imaging plane. Thus, it becomes possible to acquire a larger number of pieces of image information.

In an imaging system according to each exemplary embodiment, each apparatus (each optical system) and an imaging apparatus are mountable to each other, but the generation of a mounting error may be suppressed by integrating the apparatuses as necessary. For example, by integrally forming an optical apparatus and a lens apparatus, the optical apparatus and the lens apparatus may be regarded as one lens apparatus (accessory apparatus) mountable to the imaging apparatus. Alternatively, by integrally forming an optical apparatus and an optical element, the optical apparatus and the optical element may be regarded as one adapter apparatus (accessory apparatus) mountable to the imaging apparatus and the lens apparatus.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-195422, filed Oct. 16, 2018, which is hereby incorporated by reference herein in its entirety.

What is claimed is:

1. An optical apparatus comprising:
an optical system; and
a holding member configured to hold the optical system, wherein the holding member includes a first connection portion provided on an object side of the optical system, and a second connection portion provided between the optical system and the first connection portion, and
wherein a lens apparatus is detachably mountable to the optical apparatus via the first connection portion, and an optical element is detachably mountable to the optical apparatus via the second connection portion.

2. The optical apparatus according to claim 1, wherein the optical element is a diffusion element.

3. The optical apparatus according to claim 2, wherein, when the lens apparatus and the optical element are mounted to the optical apparatus, the optical element is disposed on an image plane of the lens apparatus.

4. The optical apparatus according to claim 2, wherein a decreasing rate of intensity of light emitted from the diffusion element, with respect to intensity of light entering the diffusion element is 50% or less within a range of ±10 [deg] with respect to a plane normal of the diffusion element.

5. The optical apparatus according to claim 1, wherein the optical element is a field lens.

6. The optical apparatus according to claim 5, wherein, when the lens apparatus and the optical element are mounted to the optical apparatus, the optical element is disposed on an object side or an image side of an image plane of the lens apparatus.

7. The optical apparatus according to claim 5, wherein, when the lens apparatus and the optical element are mounted to the optical apparatus, the following conditional expression is satisfied:

$$0.52 \le |fFL/LPL| \le 1.98$$

where a distance from an image side pupil of the lens apparatus to an object side principal point of the optical element is LPL, and a focal length of the optical element is fFL.

8. The optical apparatus according to claim 5, wherein a focal length of the lens apparatus and a focal length of the optical element are different from each other.

9. The optical apparatus according to claim 5, wherein, when the lens apparatus and the optical element are mounted to the optical apparatus, the following conditional expression is satisfied:

$$0.75 \le |fFL/LPI| \le 1.65$$

where a distance from an image side pupil of the lens apparatus to an image plane of the lens apparatus is LPI, and a focal length of the optical element is fFL.

10. The optical apparatus according to claim 5, wherein an optical surface on an image side of the optical element is a convex surface.

11. The optical apparatus according to claim 1, wherein the optical system is telecentric with respect to an object side.

12. The optical apparatus according to claim 1, wherein the optical system consists of a front lens group and a rear lens group disposed at a widest interval in the optical system, and the front lens group consists of a first lens unit having positive refractive power and a second lens unit having negative refractive power, which are disposed in order from an object side.

13. The optical apparatus according to claim 12, wherein the following conditional expression is satisfied:

$$0.60 \le |fP1/fN1| \le 4.50$$

where a focal length of the first lens unit is fP1, and a focal length of the second lens unit is fN1.

14. The optical apparatus according to claim 1, wherein a plurality of lens units each configured to form an image of an object via the optical system, and a plurality of filters disposed on optical axes of the plurality of lens units are included.

15. The optical apparatus according to claim 14, wherein the plurality of filters includes first and second filters having mutually-different transmission characteristics.

16. The optical apparatus according to claim 15, wherein transmission characteristics of all the plurality of filters are different from each other.

17. The optical apparatus according to claim 1, wherein the holding member includes a third connection portion provided on an image side of the optical system, and an accessory apparatus is detachably mountable to the optical apparatus via the third connection portion, the accessory apparatus including a plurality of lens units each configured to form an image of an object, and a plurality of filters disposed on optical axes of the plurality of lens units.

18. The optical apparatus according to claim 1, wherein the optical apparatus guides light to a unit including a plurality of lens units each configured to form an image of an object, and a plurality of filters disposed on optical axes of the plurality of lens units.

19. An imaging system comprising:
   the optical apparatus according to claim 1; and
   an image sensor configured to receive light from the optical apparatus.

20. The imaging system according to claim 19, wherein the lens apparatus and the optical element are included.

* * * * *